(12) United States Patent
Shirasaka et al.

(10) Patent No.: US 8,282,532 B2
(45) Date of Patent: Oct. 9, 2012

(54) VEHICLE DRIVE APPARATUS

(75) Inventors: Haruki Shirasaka, Anjo (JP); Noriyuki Tani, Toyota (JP); Yuji Iwatsuru, Anjo (JP); Masayoshi Kato, Anjo (JP); Takuji Akiyama, Anjo (JP); Shuichi Takeda, Anjo (JP); Masahiro Ito, Anjo (JP)

(73) Assignee: Aisin AW Co., Ltd., Aichi (JP)

( * ) Notice: Subject to any disclaimer, the term of this patent is extended or adjusted under 35 U.S.C. 154(b) by 421 days.

(21) Appl. No.: 12/637,193

(22) Filed: Dec. 14, 2009

(65) Prior Publication Data

US 2010/0167872 A1 Jul. 1, 2010

(30) Foreign Application Priority Data

Dec. 25, 2008 (JP) .................................. 2008-330213
Jul. 13, 2009 (WO) .................. PCT/JP2009/062653

(51) Int. Cl.
*F16H 61/00* (2006.01)
*B60W 10/02* (2006.01)

(52) U.S. Cl. ....................................... 477/152; 192/3.58

(58) Field of Classification Search .................. 477/115, 477/145, 146, 150, 152, 155, 156, 158, 180; 475/127, 131; 192/3.51, 3.54, 3.55, 3.57, 192/3.58

See application file for complete search history.

(56) References Cited

U.S. PATENT DOCUMENTS

| 7,909,729 | B2 * | 3/2011 | Tanaka et al. ...................... 477/8 |
| 8,056,666 | B2 * | 11/2011 | Portell et al. ................... 180/165 |
| 2002/0112552 | A1 * | 8/2002 | Harries ............................ 74/335 |
| 2002/0166530 | A1 * | 11/2002 | Tachikawa et al. ......... 123/179.3 |
| 2007/0243074 | A1 * | 10/2007 | Murakami et al. ............. 417/213 |
| 2010/0236231 | A1 * | 9/2010 | Miyabe et al. ................... 60/413 |

FOREIGN PATENT DOCUMENTS

| JP | 2000-313252 A | 11/2000 |
| JP | 2002-115755 A | 4/2002 |
| JP | 2002-130449 A | 5/2002 |
| JP | 2002339841 A | * 11/2002 |

* cited by examiner

*Primary Examiner* — Roger Pang
(74) *Attorney, Agent, or Firm* — Sughrue Mion, PLLC (57) ABSTRACT

A vehicle drive apparatus for supplying oil pressure to a hydraulic servo at restart of an engine. The vehicle drive apparatus includes an accumulator that accumulates the oil pressure, an electromagnetic switching valve that retains oil pressure of the accumulator when an oil pump is stopped, a switching valve control unit that controls opening and closing of the electromagnetic switching valve, and a restart determining unit that determines whether or not to restart the vehicle drive source from a stopped state. When it is determined by the restart determining unit to restart the vehicle drive source, the switching valve control unit is started so as to supply the oil pressure accumulated in the accumulator to the hydraulic servo. As a result, engine friction engagement elements are quickly engaged to enable starting of a vehicle.

7 Claims, 8 Drawing Sheets

FIG. 8A
BRAKE

FIG. 8B
VEHICLE SPEED

FIG. 8C
E/G SPEED

FIG. 8D
LINE PRESSURE

FIG. 8E
C-1 PRESSURE

FIG. 8F
Acc PRESSURE

FIG. 8G
ELECTROMAGNETIC
SWITCHING VALVE

FIG. 8H
STARTER SIGNAL

FIG. 9

VEHICLE DRIVE APPARATUS

INCORPORATION BY REFERENCE

The disclosure of Japanese Patent Application No. 2008-330213 filed on Dec. 25, 2008 including the specification, drawings and abstract is incorporated herein by reference in its entirety.

BACKGROUND OF THE INVENTION

The present invention relates to vehicle drive apparatuses capable of quickly supplying an oil pressure to a hydraulic servo at the restart of an engine (a vehicle drive source) to, for example, quickly engage friction engagement elements that enable starting of a vehicle.

DESCRIPTION OF THE RELATED ART

Conventionally, vehicles, which have a function to automatically stop an engine when predetermined conditions are satisfied during traveling (an idling stop function), have been used in practical applications in order to save fuel, to reduce exhaust emission, or to reduce noise, or the like. In such vehicles, the engine is stopped when, for example, all the conditions, such as a condition in which the vehicle speed is zero, a condition in which the acceleration is OFF, and a condition in which the brake is ON, are satisfied.

In general, when the engine is stopped, an oil pump connected to the engine is also stopped. Thus, oil, which is supplied to a forward traveling clutch (a hydraulic servo), which should be engaged during forward traveling, is discharged from an oil passage, whereby the forward traveling clutch is released from the engaged state.

The engine is restarted from the stopped state when predetermined restarting conditions, such as when the driver steps on an accelerator pedal, are satisfied, and in this case, the oil pump is restarted. At this time, if the forward traveling clutch fails to be engaged quickly after restarting of the engine, the forward traveling clutch is engaged in a state where the engine is racing, thereby causing engagement shocks.

In view of this problem, various technologies for preventing such generation of engagement shocks have been proposed.

For example, Japanese Patent Application Publication No. JP-A-2000-313252 describes a technology including an oil pump for generating the oil pressure, a hydraulically controlled forward traveling clutch, an accumulator that is provided in an oil passage connecting the oil pump and the forward traveling clutch in a branched state, and accumulates an oil pressure, and a normally closed type electromagnetic switching valve for causing the accumulator and the oil passage to communicate with each other or to cut off from each other. In this technology, the electromagnetic switching valve is opened at the restart of the engine to supply the oil pressure accumulated in the accumulator to the forward traveling clutch. According to this technology, since the oil pressure accumulated in the accumulator is supplied to the forward traveling clutch at the restart of the engine, the forward traveling clutch is quickly engaged, whereby generation of engagement shocks can be prevented.

SUMMARY OF THE INVENTION

In the above technology described in Japanese Patent Application Publication No. JP-A-2000-313252, the electromagnetic switching valve is opened simultaneously with restarting of the engine. That is, a vehicle control unit (ECU) simultaneously issues both a command to restore the engine, and a command to open the switching valve.

However, when restarting the engine, large current needs to be supplied to a starter for starting of the engine. Thus, a sufficient amount of current may not be supplied to the electromagnetic switching valve. This may delay opening of the electromagnetic switching valve. Such a delay in opening the electromagnetic switching valve hinders quick supply of the oil pressure accumulated in the accumulator to the forward traveling clutch. This results in a problem that generation of engagement shocks of the forward traveling clutch cannot be prevented appropriately.

Thus, the present invention has been developed in view of the above problem, and it is an object of the present invention to provide a vehicle drive apparatus, which is capable of appropriately preventing engagement shocks of a hydraulic servo by reliably opening an electromagnetic switching valve at the restart of a vehicle drive source.

A vehicle drive apparatus according to a first aspect of the present invention which is developed to solve the above problem includes: an oil pump that generates an oil pressure; a hydraulic servo that is connected to the oil pump through an oil passage, and is controllable by an oil pressure; an accumulator that accumulates the oil pressure generated by the oil pump through a branch oil passage that is branched from the oil passage; an electromagnetic switching valve that is disposed in the branch oil passage, and that retains the oil pressure of the accumulator while the oil pump is stopped; a switching valve control unit that controls opening and closing of the electromagnetic switching valve; and a restart determining unit that determines whether to restart a vehicle drive source from a stopped state or not. In the vehicle drive apparatus, when it is determined by the restart determining unit to restart the vehicle drive source, the switching valve control unit opens the electromagnetic switching valve before restarting of the vehicle drive source is started so as to supply the oil pressure accumulated in the accumulator to the hydraulic servo.

The "oil pump" may either be a mechanical pump that operates according to operation of the vehicle drive source, or an electric pump that operates by supply of electric power, and does not operate directly in accordance with the operation of the vehicle drive source.

In this vehicle drive apparatus, an oil pressure generated while the oil pump is driven is accumulated in the accumulator. On the other hand, the oil pressure of the accumulator is retained by the electromagnetic switching valve while the oil pump is stopped. If it is determined by the restart determining unit to restart the vehicle drive source after the vehicle drive source makes a temporarily stop, the electromagnetic switching valve is opened by the switching valve control unit before restarting of the vehicle drive source is started, whereby the oil pressure accumulated in the accumulator is supplied to the hydraulic servo. By thus opening the electromagnetic switching valve before restarting of the vehicle drive source is started, the electromagnetic switching valve can be opened before large current is supplied to a starter or the like. This, current required to open the electromagnetic switching valve can be reliably secured, whereby the electromagnetic switching valve can be reliably opened when restarting the vehicle drive source. As a result, when restarting the vehicle drive source, the oil pressure in the accumulator can be reliably supplied to the hydraulic servo, and engagement shocks of the hydraulic servo can be appropriately prevented.

The accumulator generally requires about several seconds to accumulate the oil pressure. Thus, in the vehicle drive apparatus, the time during which the electromagnetic switching valve is closed to retain the oil pressure is actually longer than the time during which the electromagnetic switching valve is opened to accumulate the oil pressure.

Therefore, in the above vehicle drive apparatus, the electromagnetic switching valve may be a normally closed type valve that is opened when being energized, and is closed when being de-energized.

Thus, the use of a normally closed type valve as the electromagnetic switching valve enables the accumulated oil pressure in the accumulator to be retained without supplying electric power to the electromagnetic switching valve. In other words, the electromagnetic switching valve can be efficiently controlled, and the electric power required to drive the electromagnetic switching valve can be reduced.

In the above vehicle drive apparatus, the switching valve control unit may open the electromagnetic switching valve only for a predetermined time during steady operation of the vehicle drive source in order to accumulate the oil pressure in the accumulator.

The "steady operation of the vehicle drive source" herein means operation in the case where it is determined that controlling of a clutch engagement state between full engagement and release is not required.

Thus, by opening the electromagnetic switching valve only for a predetermined time during steady operation of the vehicle drive source, the oil pressure can be accumulated in the accumulator while the clutch engagement states of full engagement and release are stable. Thus, the oil pressure can be accumulated in the accumulator while solving the problem that the clutch pressure is not controlled appropriately.

In the above vehicle drive apparatus, restarting of the vehicle drive source may be started after opening of the electromagnetic switching valve by the switching valve control unit is completed.

In view of the time required to complete opening of the electromagnetic switching valve, a structure in which restarting of the vehicle drive source is started after, e.g., about 50 ms from the time when opening the electromagnetic switching valve is started can be shown as one example of this aspect of this vehicle drive apparatus, although the present invention is not specifically limited to this.

Thus, restarting of the vehicle drive source is started after opening of the electromagnetic switching valve by the switching valve control unit is completed. Therefore, current is supplied to a starter and the like in the state where the electromagnetic switching valve is reliably opened. That is, when restarting the vehicle drive source, the electromagnetic switching valve is reliably opened, whereby the oil pressure in the accumulator can be more reliably supplied to the hydraulic servo. Thus, when restarting the vehicle drive source, the oil pressure is more reliably supplied to the hydraulic servo, whereby engagement shocks of the hydraulic servo can be appropriately prevented.

The following can be shown as an example of this aspect of the above vehicle drive apparatus. The vehicle drive apparatus further includes: a belt-type continuously variable transmission including an input shaft to which power of the vehicle drive source is input, an output shaft that shifts the power input to the input shaft and outputs the shifted power, a first pulley formed by a pair of sheaves provided on the input shaft, a second pulley formed by a pair of sheaves provided on the output shaft, a belt wound in a groove between the sheaves of the first pulley and a groove between the sheaves of the second pulley to run between the first pulley and the second pulley, a first hydraulic cylinder capable of changing a groove width between the sheaves of the first pulley, and a second hydraulic cylinder capable of changing a groove width between the sheaves of the second pulley. In the vehicle drive apparatus, the belt-type continuously variable transmission changes the groove width between the sheaves of the first pulley, and the groove width between the sheaves of the second pulley by using the first hydraulic cylinder and the second hydraulic cylinder so as to continuously shift the power input from the vehicle drive source to the input shaft to output the shifted power from the output shaft. Further, in the vehicle drive apparatus, the hydraulic servo transmits the power from the vehicle drive source to the input shaft when the oil pressure is supplied to the hydraulic servo, the second hydraulic cylinder is connected to the oil pump through an oil passage, and a second electromagnetic switching valve that selectively retains an oil pressure of the second hydraulic cylinder is provided in the oil passage that connects the second hydraulic cylinder and the oil pump to each other.

According to this aspect, the oil pressure of the second hydraulic cylinder can be selectively retained by the second electromagnetic switching valve provided in the oil passage connecting the second hydraulic cylinder and the oil pump to each other. Thus, for example, if the vehicle drive source is stopped, and no oil is supplied from the oil pump to the second hydraulic cylinder, oil leakage from the second hydraulic cylinder can be prevented, and air can be prevented from entering the cylinder. Moreover, air can also be prevented from entering the second hydraulic cylinder when the oil pressure is supplied from the oil pump to the second hydraulic cylinder at the restart of the vehicle drive source.

In the vehicle drive apparatus according to this aspect, the vehicle drive apparatus may further include: a second switching valve control unit that controls opening and closing of the second electromagnetic switching valve, and when the vehicle drive source is in an idling stop state, and the switching valve control unit retains the oil pressure accumulated in the accumulator by closing the electromagnetic switching valve, the second switching valve control unit may close the second electromagnetic switching valve to retain the oil pressure of the second hydraulic cylinder, and when the vehicle drive source is in a stopped state other than the idling stop state, the second switching valve control unit may open the second electromagnetic switching valve to release the oil pressure of the second hydraulic cylinder.

According to this aspect, when the vehicle drive source is in the idling stop state, and the switching valve control unit retains the oil pressure accumulated in the accumulator by closing the electromagnetic switching valve, the second switching valve control unit closes the second electromagnetic switching valve to retain the oil pressure of the second hydraulic cylinder. This can prevent oil leakage from the second hydraulic cylinder, and thus, prevent air from entering the cylinder, while the vehicle drive source is in the idling stop state. Moreover, this can prevent air from being introduced into the second hydraulic cylinder when the oil pressure is supplied from the oil pump to the second hydraulic cylinder at the restart of the vehicle drive source.

On the other hand, when the vehicle drive source is in a stopped state other than the idling stop state, the second switching valve control unit opens the second electromagnetic switching valve to release the oil pressure of the second hydraulic cylinder. Thus, the groove width between the sheaves of the second pulley is changed, whereby the gear ratio can be adjusted. For example, in common continuously variable transmissions, a relatively low gear ratio (a low gear) can be established by a biasing force of a return spring when the oil pressure of the second hydraulic cylinder is released.

In the vehicle drive apparatus according to this aspect, each of the first hydraulic cylinder and the second hydraulic cylinder may include a seal member that retains the oil pressure in the corresponding cylinder when no oil pressure is supplied from the oil pump, and the seal member of the first hydraulic cylinder may have a superior seal property to the sealing property of the seal member of the second hydraulic cylinder.

According to this aspect, if a seal member having a superior seal property to that of the seal member of the second hydraulic cylinder is used as the seal member of the first hydraulic cylinder, the seal property of the first hydraulic cylinder can be ensured by using a simple structure. Moreover, according to this aspect, in the case where the vehicle is towed with the vehicle drive source stopped, a centrifugal force can be applied to oil remaining in the first hydraulic cylinder by using rotation of the input shaft during towing. By using the oil pressure generated by this centrifugal force, the groove width between the sheaves of the first pulley is reduced (that is, the winding radius of the belt is increased), whereby the high gear can be established. Thus, establishing the high gear during towing of the vehicle can prevent seizures of the pulleys, and the like.

As described above, according to the vehicle drive apparatus of the present invention, engagement shocks of a hydraulic servo can be appropriately prevented by reliably opening an electromagnetic switching valve at the restart of the engine.

DETAILED DESCRIPTION OF THE EMBODIMENTS

Figure 1:
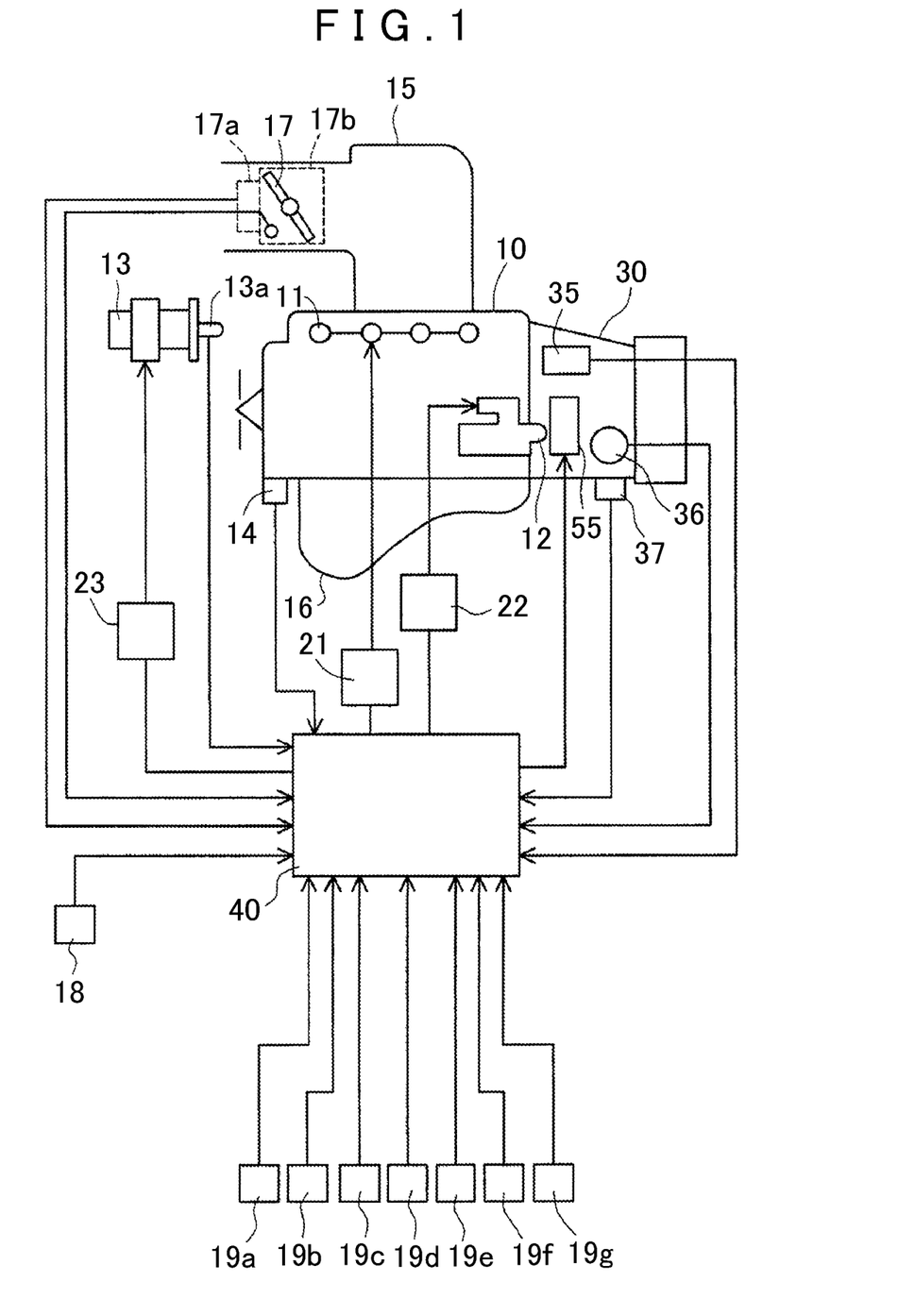
FIG. 1 is a diagram showing a schematic structure of a vehicle drive system according to an embodiment.

Preferred embodiments, which embody a vehicle drive apparatus of the present invention, will be described in detail below with reference to the accompanying drawings. In the example shown below, the present invention is applied to a vehicle drive system including a continuously variable transmission (CVT). A vehicle drive system of an embodiment will be described below with reference to FIG. 1. FIG. 1 is a diagram showing a schematic structure of a vehicle drive system according to the embodiment.

First Embodiment

As shown in FIG. 1, a drive system of a first embodiment includes an engine 10, a CVT 30, a control unit 40 for generally controlling the system, and various sensors for detecting the respective states of the engine 10, the CVT 30, and a vehicle, and the like. Note that the engine 10 of the present embodiment corresponds to a "vehicle drive source" of the present invention.

The engine 10 is provided with an injector 11, a starter 12, and an igniter 13. The CVT 30 is connected to an output shaft of the engine 10.

A take manifold 15 and an exhaust manifold 16 are connected to each cylinder of the engine 10. A throttle valve 17, which operates according to operation of an accelerator pedal, is provided in the intake manifold 15. The throttle valve 17 is provided with a throttle position sensor 17a for detecting a throttle opening of the throttle valve 17, and an idle switch 17b for detecting a fully closed state. Moreover, the injector 11, the starter 12, and the igniter 13 are connected to the control unit 40 though a fuel relay 21, a starter relay 22, and an ignition relay 23, respectively.

Figure 2:
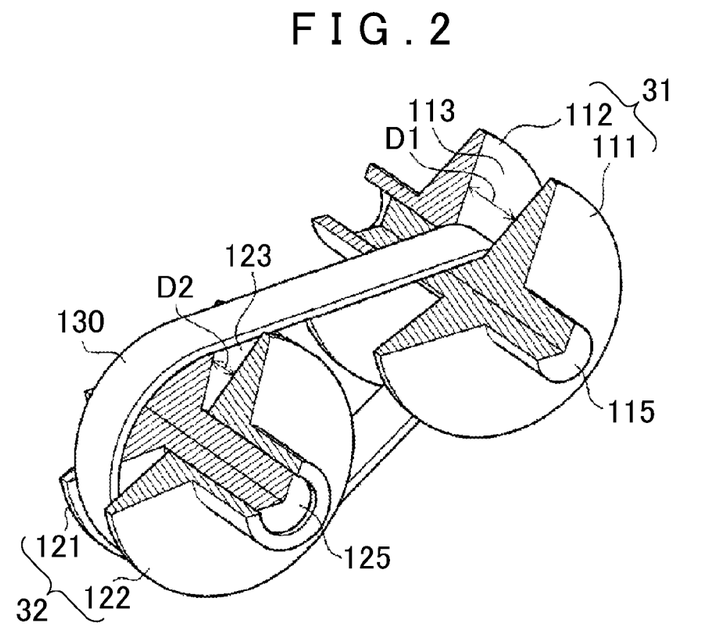
FIG. 2 is a perspective view showing the state of a primary pulley and a secondary pulley when establishing a low gear of a continuously variable transmission.
Figure 3:
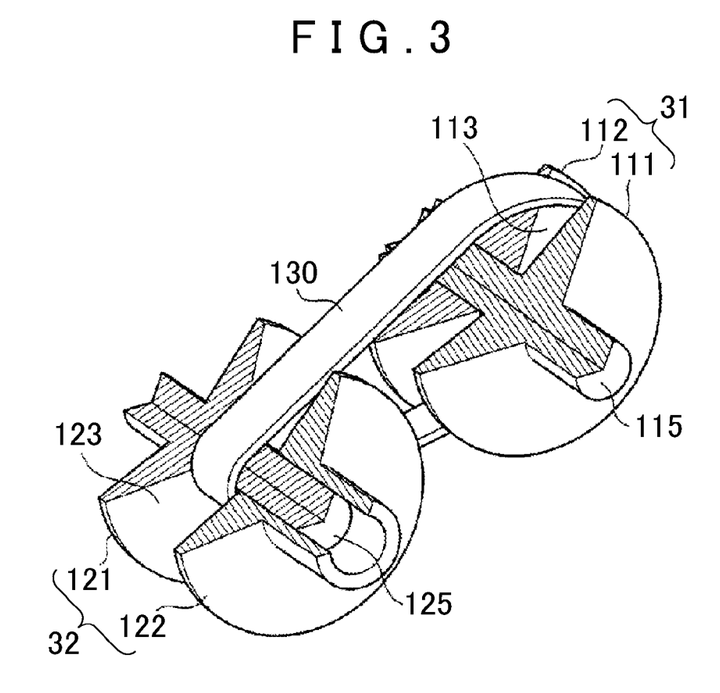
FIG. 3 is a perspective view showing the state of the primary pulley and the secondary pulley when establishing a high gear of the continuously variable transmission.
Figure 4:
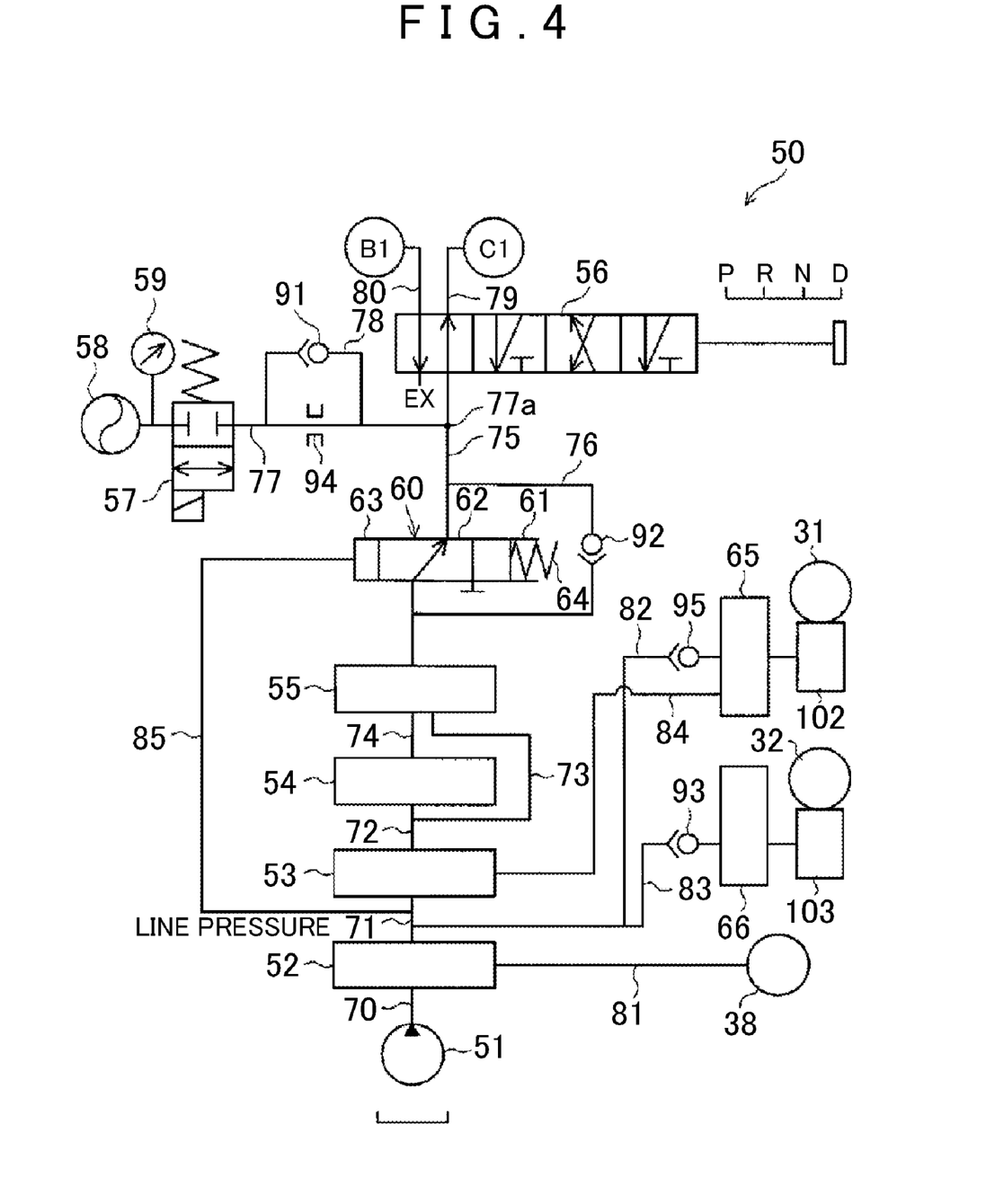
FIG. 4 is a diagram showing a hydraulic circuit included in the continuously variable transmission.

Next, the structure of the CVT 30 will be described with reference to FIGS. 2 through 4. FIG. 2 is a perspective view showing the state of a primary pulley and a secondary pulley when establishing a low gear of the CVT. FIG. 3 is a perspective view showing the state of the primary pulley and the secondary pulley when establishing a high gear of the CVT. FIG. 4 is a diagram showing a hydraulic circuit included in the CVT.

As shown in FIG. 2, the CVT 30 includes: an input shaft 115 to which the power of the engine 10 is input through a torque converter 38 (see FIG. 4) and a forward/rearward traveling switching clutch, and the like; an output shaft 125 that is disposed parallel to the input shaft 115 and outputs the power toward the driving wheel; a primary pulley 31 provided on the input shaft 115; a secondary pulley 32 provided on the output shaft 125; a V-belt 130 that is wound around the primary pulley 31 and the secondary pulley 32 so as to run between the primary pulley 31 and the secondary pulley 32; a hydraulic cylinder 102 (see FIG. 4) provided in the primary pulley 31; and a hydraulic cylinder 103 (see FIG. 4) provided in the secondary pulley 32. The power of the engine 10 input to the input shaft 115 is transmitted to the output shaft 125 through the primary pulley 31, the V-belt 130, and the secondary pulley 32.

The primary pulley 31 is formed by a fixed sheave 111 fixed to the input shaft 115, and a movable sheave 112 provided on the input shaft 115 so as to be slidable in an axial direction. The movable sheave 112 is structured to slide in the axial direction by the hydraulic cylinder 102. Respective opposing surfaces of the fixed sheave 111 and the movable sheave 112 are conical surfaces. Thus, a V-groove 113 having a V-shaped cross section is formed between the fixed sheave 111 and the movable sheave 112. The V-belt 113 is inserted in the V-groove 113. Note that the primary pulley 31 of the present embodiment corresponds to a "first pulley" of the present invention.

The secondary pulley 32 is formed by a fixed sheave 121 fixed to the output shaft 125, and a movable sheave 122 provided on the output shaft 125 so as to be slidable in the axial direction. The movable sheave 122 is structured to slide in the axial direction by the hydraulic cylinder 103. Respective opposing surfaces of the fixed sheave 121 and the movable sheave 122 are conical surfaces. Thus, a V-groove 123 having a V-shaped cross section is formed between the fixed sheave 121 and the movable sheave 122. The V-belt 123 is inserted in the V-groove 130. Note that the secondary pulley 32 of the present embodiment corresponds to a "second pulley" of the present invention.

In this belt-type CVT 30, a groove width D1 of the V-groove 113 of the primary pulley 31 and a groove width D2 of the V-groove 123 of the secondary pulley 32 are changed by using the hydraulic cylinder 102 and the hydraulic cylinder 103. Thus, the power, which is input from the engine 10 to the input shaft 115, can be continuously shifted and output from the output shaft 125. For example, when establishing a low gear, as shown in FIG. 2, the winding radius of the V-belt 130 on the primary pulley 31 becomes smaller than the winding radius of the V-belt 130 on the secondary pulley 32. Note that, at an initial stage of stopping the engine 10, the low gear is established by a return spring (not shown) provided in the primary pulley 31.

Moreover, when establishing a high gear, as shown in FIG. 3, the hydraulic cylinder 102 slides the movable sheave 112 of the primary pulley 31 so as to reduce the groove width D1 of the V-groove 113, and the hydraulic cylinder 103 slides the movable sheave 122 of the secondary pulley 32 so as to increase the groove width D2 of the V-groove 123. Thus, the winding radius of the V-belt 130 on the primary pulley 31 is increased, and the winding radius of the V-belt 130 on the secondary pulley 32 is reduced. In this manner, the rotational speed of the output shaft 125 is increased with respect to the input shaft 115, whereby the high gear is established.

Moreover, as shown in FIG. 1, the CVT 30 is provided with a shift position switch 35 for detecting a shift position (range) established by operation of the driver, and a vehicle speed sensor 36 for detecting the vehicle speed based on the rotational speed of the output shaft 125 of the CVT 30 connected to a propeller shaft. The CVT 30 is further provided with an oil temperature sensor 37 for detecting the oil temperature in the CVT.

The control unit 40 includes a CPU for controlling various instruments, a ROM in which various numerical values and programs are written, a RAM in which numerical values and flags in the process of calculation are written into a predetermined region, and the like. Note that programs of, for example, an engine stop processing and an engine restart processing, which are described below, are prestored in the ROM of the control unit 40. This control unit 40 corresponds to "switching valve control unit" and "restart determining unit" of the present invention.

An ignition primary coil 13a of the igniter 13, a crank position sensor 14, the throttle position sensor 17a, the idle switch 17b, an ignition switch 18, the shift position switch 35, the vehicle speed sensor 36, the CVT oil temperature sensor 37, a G sensor 19a, a water temperature sensor 19b, a battery voltage sensor 19c, a brake pedal switch 19d, a brake master cylinder pressure sensor 19e, an intake air temperature sensor 19f, an intake air amount sensor 19g, and the like are connected to the control unit 40. Moreover, an electromagnetic switching valve 57 and a hydraulic sensor 59, which are provided in the CVT 30, are connected to the control unit 40 as described below. The control unit 40 performs various calculations based on signals from various switches and sensors to output an ignition cut signal and an ignition signal, a fuel cut signal and a fuel injection signals, a starter drive signal, a drive signal for the electromagnetic switching valve 57, and the like.

Next, a hydraulic circuit 50 included in the CVT 30 will be described with reference to FIG. 4. As shown in FIG. 4, the hydraulic circuit 50 includes an oil pump 51, a line pressure regulator valve 52, a clutch pressure control valve 53, a clutch control valve 54, a shift valve 55, a manual valve 56, the electromagnetic switching valve 57, an accumulator 58, a cutoff valve 60, a shift control valve 65, and a secondary sheave pressure control valve 66. This hydraulic circuit 50 is connected to a forward traveling clutch C1, a rearward traveling brake B1, the torque converter 38, and the primary pulley 31 and the secondary pulley 32. This forward traveling clutch C1 corresponds to a "hydraulic servo" of the present invention.

The oil pump 51 is a mechanical pump that operates according to operation of the engine 10, and serves as an oil pressure source of the entire CVT 30. The line pressure regulator valve 52 controls an oil pressure that is generated by the oil pump 51 to a predetermined value in order to control the respective pulley positions of the primary pulley 31 and the secondary pulley 32. The clutch pressure control valve 53 controls an oil pressure regulated by the line pressure regulator valve 52 (a line pressure) to a predetermined value for operating the forward traveling clutch C1 and the rearward traveling brake B1. The clutch control valve 54 controls the oil pressure, regulated by the clutch pressure control valve 53, to a predetermined value for operating the forward traveling clutch C1, when controlling a clutch engagement state between full engagement and release, for example, when performing neutral control. The shift valve 55 selects either the oil pressure regulated by the clutch pressure control valve 53 or the oil pressure regulated by the clutch control valve 54, as the oil pressure to be supplied to the forward traveling clutch C1 or the rearward traveling brake B1.

Operation of these valves 52 through 55 is respectively controlled by solenoids, and the valve operation is controlled by controlling current to be supplied to the solenoids.

The manual valve 56 switches an oil passage according to the shift position operation by the driver. The accumulator 58 temporarily accumulates the oil pressure that is generated by the oil pump 51 and regulated by the clutch pressure control valve 53.

In this hydraulic circuit 50, the oil pump 51 and the line pressure regulator valve 52 are connected to each other by an oil passage 70. Moreover, the line pressure regulator valve 52 and the torque converter 38 are connected to each other by an oil passage 81. Moreover, the line pressure regulator valve 52 and the clutch pressure control valve 53 are connected to each other by an oil passage 71. Oil passages 82, 83 are branched from the oil passage 71, and the oil passages 82, 83 are connected to the primary pulley 31 or the secondary pulley 32, respectively. More specifically, the oil passage 82 is connected to the primary pulley 31 through the shift control valve 65, and the oil passage 83 is connected to the secondary pulley 32 through the secondary sheave pressure control valve 66.

In the oil passage 83, a one-way valve 93 for supplying oil only in the direction from the line pressure regulator valve 52 toward the secondary pulley 32 is provided upstream of the secondary sheave pressure control valve 66. This can prevent oil leakage from the secondary pulley 32 to the line pressure regulator valve 52 while the oil pump 51 is stopped. Thus, oil can be prevented from leaking from the secondary pulley 32, and air can also be prevented from entering the secondary pulley 32. This can prevent air from being mixed into the oil that is supplied from the oil pump after restarting of the engine, whereby the oil pressure performance after restarting of the engine can be improved.

In the oil passage 82, a one-way valve 95 for supplying oil only in the direction from the oil passage 71 toward the primary pulley 31 is provided upstream of the shift control valve 65. This can prevent oil from leaking from the primary pulley 31 into the oil passage 71 while the oil pump 51 is stopped. Thus, oil can be prevented from leaking from the primary pulley 31, and air can also be prevented from entering the primary pulley 31. This can prevent introduction of air into the oil supplied from the oil pump after restarting of the engine, whereby the oil pressure performance after restarting of the engine can be improved.

An oil passage 85 is also branched from the oil passage 71, and this oil passage 85 is connected to an oil pressure chamber 63 of the cutoff valve 60. Thus, the line pressure is supplied to the oil pressure chamber 63 of the cutoff valve 60.

Moreover, the clutch pressure control valve 53 and the clutch control valve 54 are connected to each other by an oil passage 72, and the clutch control valve 54 and the shift valve 55 are connected by an oil passage 74. Moreover, the clutch pressure control valve 53 is connected to the shift control valve 65 through an oil passage 84. An oil passage 73 is branched from the oil passage 72, and the oil passage 73 is connected to the shift valve 55. That is, the oil passage 73 is provided so as to bypass the clutch control valve 54.

Moreover, the shift valve 55 and the manual valve 56 are connected to each other by an oil passage 75. The manual valve 56 and the forward traveling clutch C1 are connected to each other by an oil passage 79, and the manual valve 56 and the rearward traveling brake B1 are connected to each other by an oil passage 80. Thus, when the manual valve 56 is set to a forward traveling position (a D range), the oil passage 75 and the oil passage 79 communicate with each other, and the oil passage 80 and a drain EX are connected to each other. Moreover, when the manual valve 56 is set to a rearward traveling position (in an R range), the oil passage 75 and the oil passage 80 communicate with each other, and the oil passage 79 and the drain EX are connected to each other. Moreover, when the manual valve 56 is set to a neutral position (in an N range) or a parking position (in a P range), the oil passage 75 is cut off from both oil passages 79, 80, and the oil passages 79, 80 are connected to the drain EX. Thus, at a position where no oil pressure is required for the forward traveling clutch C1 (in ranges other than the D range), the oil pressure applied to the forward traveling clutch C1 is discharged from the drain EX by the manual valve 56. At a position where no oil pressure is required for the rearward traveling brake B1 (in ranges other than the R range), the oil pressure applied to the rearward traveling brake B1 is discharged from the drain EX by the manual valve 56.

Moreover, a branch oil passage 77 whose one end is connected to the accumulator 58 is connected to the oil passage 75 at a junction point 77a. In the oil passage 75, the cutoff valve 60, capable of cutting off the oil passage 75, is provided between the junction point 77a at which the branch oil passage 77 is branched from the oil passage 75 and the shift valve 55. In the cutoff valve 60, a valve element 62 for switching the oil passage 75 between a communicating state and a cutoff state is slidably provided in a valve body 61. A spring 64 is provided in a compressed state on one side of the valve element 62, and the oil pressure chamber 63 is provided on the other side thereof. Thus, the valve element 62 moves according to the force relation between a biasing force from the spring 64 and the oil pressure supplied to the oil pressure chamber 63, thereby switching the oil passage 75 between the communicating state and the cutoff state. That is, the cutoff valve 60 cuts off the oil passage 75 in the state where no oil pressure is supplied to the oil pressure chamber 63, and renders the oil passage 75 in the communicating state in the state where the oil pressure is supplied to the hydraulic chamber 63.

A branch oil passage 76 is further provided for the oil passage 75. This branch oil passage 76 has one end connected between the shift valve 55 and the cutoff valve 60, and the other end connected between the cutoff valve 60 and the junction point 77a, so as to bypass the cutoff valve 60. A one-way valve 92 for supplying oil only in the direction from the shift valve 55 toward the junction point 77a is disposed in the branch oil passage 76. This enables the oil pressure, generated in the oil pump 51, to be supplied to the forward traveling clutch C1 or the rearward traveling brake B1 through the oil passage 76, even if the oil passage 75 remains in the cut-off state due to a failure of the cutoff valve 60.

On the other hand, in the branch oil passage 77, the electromagnetic switching valve 57 is provided between the accumulator 58 and the junction point 77a. The electromagnetic switching valve 57 is a normally closed type valve that is opened when being energized, and closed when being de-energized. This electromagnetic switching valve 57 is controlled to be opened and closed by the control unit 40, where the electromagnetic switching valve 57 is opened while the oil pump 61 is driven, and is closed while the oil pump 51 is stopped. That is, the branch oil passage 77 is switched between the communicating state and the cutoff state by opening and closing the electromagnetic switching valve 57. The hydraulic sensor 59 for detecting the oil pressure accumulated in the accumulator 58 is provided in the branch oil passage 77 between the accumulator 58 and the electromagnetic switching valve 57.

Moreover, the branch oil passage 77 has an orifice 94 between the junction point 77a at which the branch oil passage 77 is branched from the oil passage 75 and the electromagnetic switching valve 57. A branch oil passage 78 is provided so as to bypass the orifice 94. A one-way valve 91 for supplying oil only in the direction from the accumulator 58 toward the oil passage 75 is disposed in the branch oil passage 78. Thus, oil flows through the orifice 94 when the oil pressure is accumulated in the accumulator 58, and oil flows through the branch oil passage 78 when the accumulated oil pressure is supplied from the accumulator 58.

Next, operation of the vehicle drive system having the above structure will be described. In the vehicle drive system of the present embodiment, the oil pump 51 is driven by the driving force of the engine 10 during traveling of the vehicle, and the oil pressure is supplied to the hydraulic circuit 50. At this time, the oil pressure generated by the oil pump 51 is supplied to the accumulator 58 through the oil passages 70 through 75, 77, in addition to the CVT 30.

Figure 5:
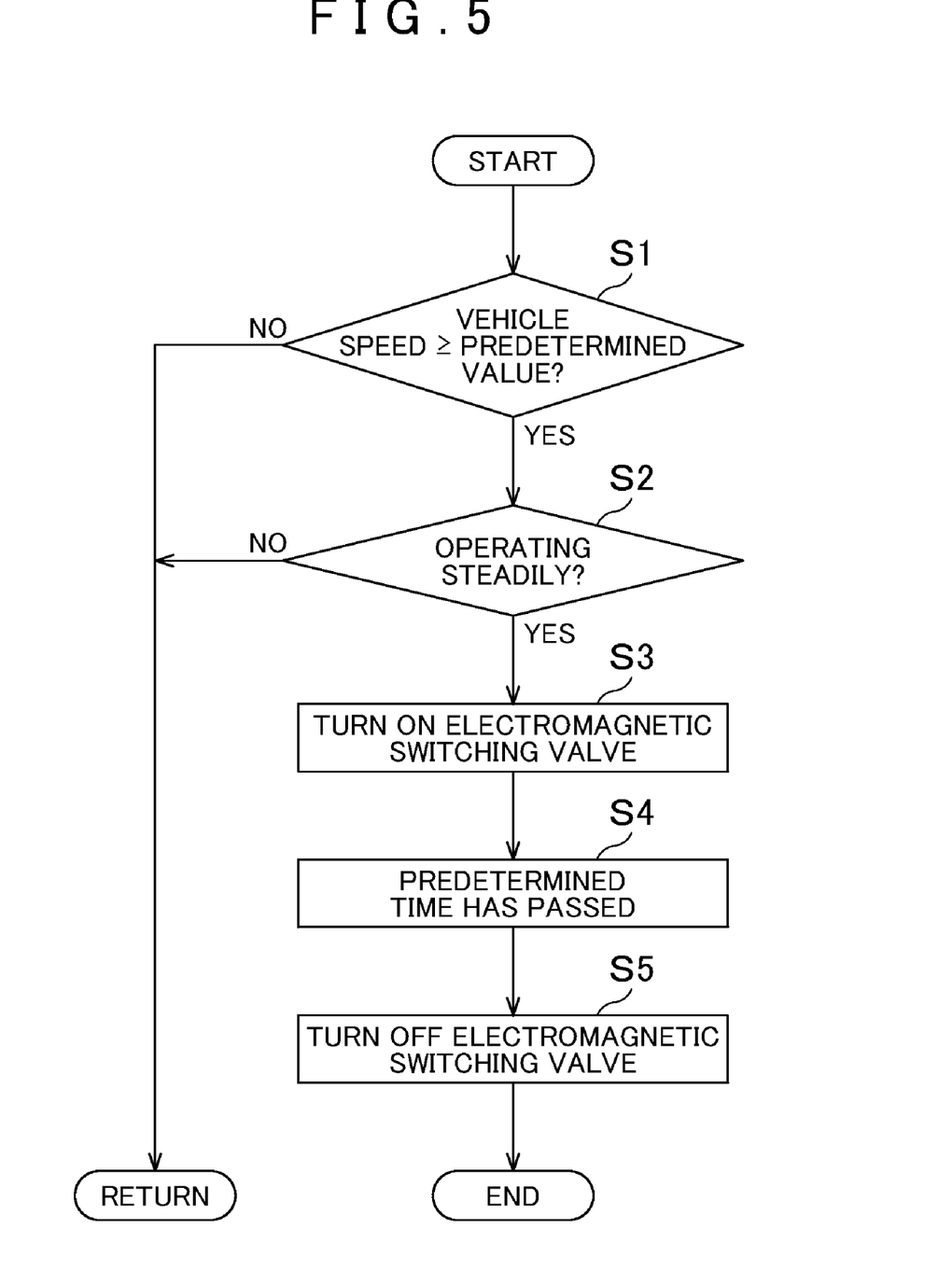
FIG. 5 is a flowchart illustrating the processing that is performed by a control unit when a vehicle is traveling steadily.

In the vehicle drive system of the present embodiment, the oil pressure generated by driving the oil pump 51 is accumulated in the accumulator 58 during steady traveling of the vehicle. The processing that is performed by the control unit 40 during steady traveling of the vehicle will be described with reference to FIG. 5. FIG. 5 is a flowchart illustrating the processing that is performed by the control unit during steady traveling of the vehicle.

As shown in FIG. 5, in step S1, the control unit 40 determines whether the vehicle speed is a predetermined value or more. More specifically, the control unit 40 makes this determination based on a vehicle speed signal detected from the vehicle speed sensor 36. Then, if the vehicle speed is the predetermined value or more (S1: YES), the control unit 40 proceeds to step S2. On the other hand, if the vehicle speed is not the predetermined value or more (S1: NO), the control unit 40 terminates this processing routine.

In step S2, the control unit 40 determines whether the vehicle is operating steadily or not. More specifically, the control unit 40 makes this determination based on signals detected from the vehicle speed sensor 36 and the like. If it is determined that the vehicle is operating steadily (S2: YES), the control unit 40 proceeds to step S3. On the other hand, if it is determined that the vehicle is not operating steadily (S2: NO), the control unit 40 terminates this processing routine.

In step S3, the control unit 40 switches the electromagnetic switching valve 57 to an open state (an ON state). More specifically, the control unit 40 energizes the electromagnetic switching valve 57 by supplying electric power. Since the electromagnetic switching valve 57 of the present embodiment is a normally closed type valve, the electromagnetic switching valve 57 is opened by this energization. Thus, the branch oil passage 77 is rendered in the communicating state, and the oil pressure of the oil pump 51 is accumulated in the accumulator 58. Then, the control unit 40 proceeds to step S4.

In step S4, the control unit 40 stops the processing until a predetermined time passes. A time required for the oil pressure in the accumulator 58 to reach a required value or more can be used as the predetermined time, and the predetermined time can be determined according to the capacity of the accumulator 58. Note that whether a predetermined oil pressure has been accumulated in the accumulator 58 or not may be determined based on an oil pressure signal from the hydraulic sensor 59. The control unit 40 proceeds to step S5 after the predetermined time.

In step S5, the electromagnetic switching valve 57 is switched to a closed state (in an OFF state). More specifically, the control unit 40 stops energization of the electromagnetic switching valve 57. As described above, since the electromagnetic switching valve 57 is a normally closed type valve, the electromagnetic switching valve 57 is closed when energization of the electromagnetic switching valve 57 is stopped. Thus, the branch oil passage 77 is rendered in a cut-off state, whereby the oil pressure accumulated in the accumulator 58 is retained. Then, the control unit 40 terminates the processing.

In this manner, the required oil pressure is accumulated in the accumulator 58 during steady traveling of the vehicle.

Figure 6:
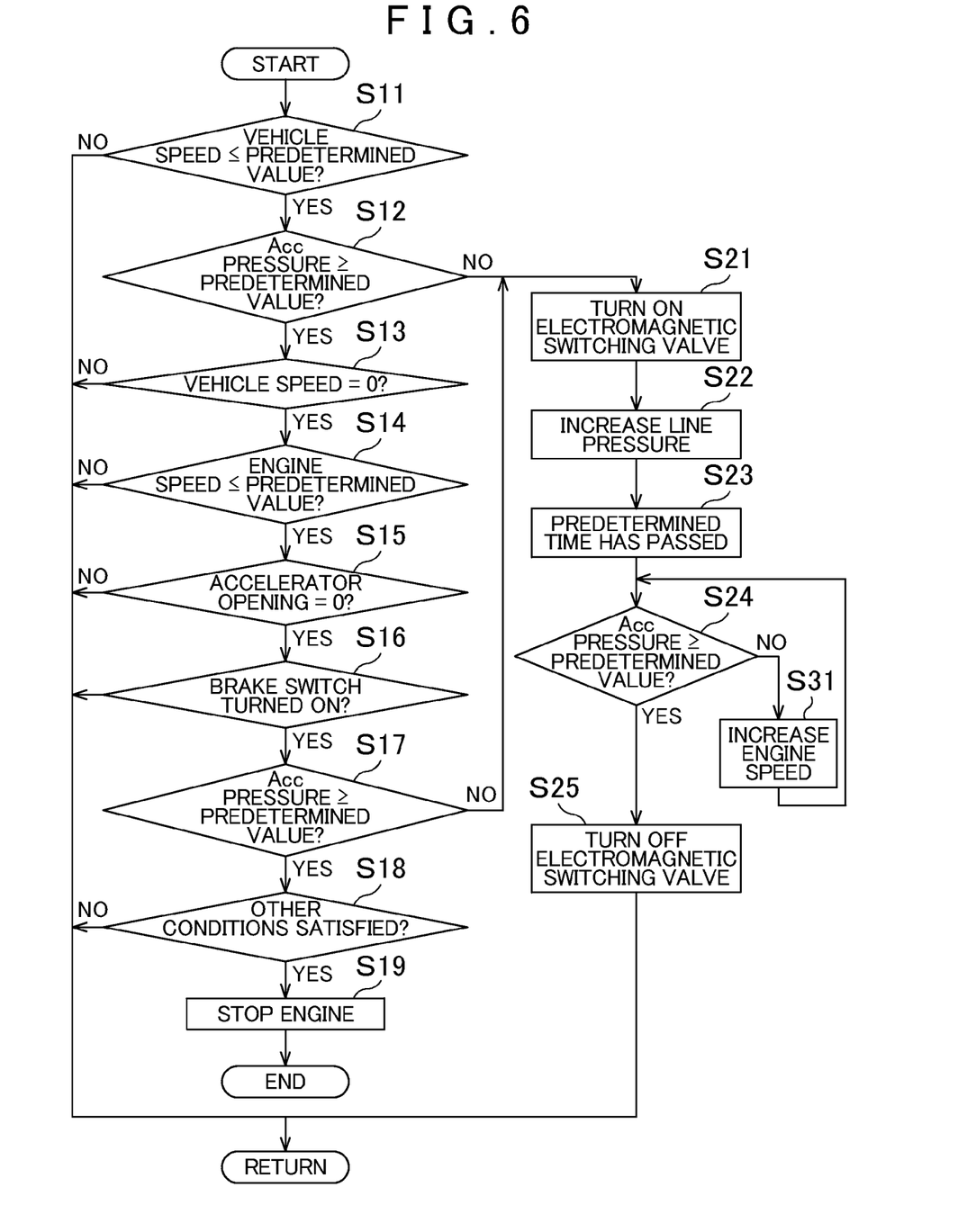
FIG. 6 is a flowchart illustrating the processing of stopping an engine by the control unit.

In the vehicle drive system of the present embodiment, the control unit 40 temporarily stops the engine 10 (an idling stop state) when predetermined conditions are satisfied. This processing of stopping the engine will be described with reference to FIG. 6. FIG. 6 is a flowchart illustrating the processing of stopping the engine by the control unit.

As shown in FIG. 6, in step S11, the control unit 40 determines whether the vehicle speed is a predetermined value or less. More specifically, the control unit 40 makes this determination based on a vehicle speed signal detected from the vehicle speed sensor 36. If it is determined that the vehicle speed is the predetermined value or less (S11: YES), the control unit 40 proceeds to step S12. On the other hand, if it is determined that the vehicle speed is not the predetermined value or less (S11: NO), the control unit 40 terminates the processing routine.

In step S12, the control unit 40 determines whether an Acc pressure (a pressure accumulated in the accumulator 58) is a predetermined value or more. More specifically, the control unit 40 makes this determination based on the oil pressure detected by the oil pressure sensor 59. If it is determined that the Acc pressure is the predetermined value or more (S12: YES), the control unit 40 proceeds to step S13. On the other hand, if it is determined that the Acc pressure is not the predetermined value or more (S12: NO), the control unit 40 proceeds to step S21.

In step S13, the control unit 40 determines whether the vehicle speed is zero or not. More specifically, the control unit 40 makes this determination based on a vehicle speed signal detected from the vehicle speed sensor 36. If it is determined that the vehicle speed is zero (S13: YES), the control unit 40 proceeds to step S14. On the other hand, if it is determined that the vehicle speed is not zero (S13: NO), the control unit 40 terminates the processing routine.

In step S14, the control unit 40 determines whether the rotational speed of the engine 10 (the engine speed) is a predetermined value or less. More specifically, the control unit 40 makes this determination based on an engine speed signal detected from the crank position sensor 14. The predetermined engine speed is, e.g., an engine speed that is slightly higher than an idling speed. If it is determined that the engine speed of the engine 10 is the predetermined value or less (S14: YES), the control unit 40 proceeds to step S15. On the other hand, if it is determined that the engine speed of the engine 10 is not the predetermined value or less (S14: NO), the control unit 40 terminates this processing routine.

In step S15, the control unit 40 determines whether an accelerator opening is zero or not. More specifically, the control unit 40 makes this determination based on an accelerator opening signal detected from the throttle position sensor 17a. If it is determined that the accelerator opening is zero (S15: YES), the control unit 40 proceeds to step S16. On the other hand, if it is determined that the accelerator opening is not zero (S15: NO), the control unit 40 terminates this processing routine.

In step S16, the control unit 40 determines whether a brake switch is ON or not. More specifically, the control unit 40 makes this determination based on a signal detected from the brake pedal switch 19d. Note that, a detection signal from the brake master cylinder pressure sensor 19e may also be considered in order to determine more accurately whether the brake pedal switch 19d is ON or not, that is, whether a braking device of the vehicle is operating or not. In this case, for example, the control unit 40 may determine that the brake switch is ON, only when the brake pedal switch is ON, and the pressure detected by the brake master cylinder pressure sensor 19e is a predetermined value or more. If it is determined that the brake switch is ON (S16: YES), the control unit 40 proceeds to step S17. On the other hand, if it is determined that the brake switch is not ON (S16: NO), the control unit 40 terminates this processing routine.

In step S17, the control unit 40 determines again whether the Acc pressure is a predetermined value or more. This determination is also made based on the oil pressure detected by the oil pressure sensor 59. If it is determined that the Acc pressure is the predetermined value or more (S17: YES), the control unit 40 proceeds to step S18. On the other hand, if it is determined that the Acc pressure is not the predetermined value or more (S17: NO), the control unit 40 proceeds to step S21.

Note that, since it has been determined in step S12 that the Acc pressure is the predetermined value or more, it is rarely determined in step S17 that the Acc pressure is not the predetermined value or more. However, by confirming the accumulated oil pressure in the accumulator 58 again in step S17, the required oil pressure can be more reliably accumulated in the accumulator 58 before stopping the engine.

In step S18, the control unit 40 determines whether other conditions for stopping the engine have been satisfied. These other conditions for stopping the engine include, for example, determination of hill climbing and inclination based on an output signal from the G sensor 19a (this condition is satisfied when the inclination angle is a predetermined value or less), determination of the engine water temperature based on an output signal from the water temperature sensor 19b (this condition is satisfied when the water temperature is in a predetermined range), determination of the battery voltage based on an output signal of the battery voltage sensor 19c (this condition is satisfied when the battery voltage is a predetermined value or more), determination of the CVT oil temperature based on an output signal from the oil temperature sensor 37 (this condition is satisfied when the CVT oil temperature is in a predetermined range), the time elapsed since the previous starting of the engine (this condition is satisfied when the elapsed time is a predetermined value or more), the vehicle speed history (this condition is satisfied when the vehicle speed has been a predetermined value or more), and the like. If it is determined that these other conditions for stopping the engine have been satisfied (S18: YES), the control unit 40 proceeds to step S19. On the other hand, if it is determined that these other conditions for stopping the engine have not been satisfied (S18: NO), the control unit 40 terminates the processing routine.

In step S19, the control unit 40 stops the engine 10. More specifically, the control unit 40 outputs the fuel cut signal, the ignition cut signal, and the like that form an engine stop signal to the fuel relay 21, the ignition relay 23, and the like, respectively. As a result, no high voltage is supplied from the igniter 13 to an ignition plug, and no fuel is injected from the injector 11, whereby the engine 10 is stopped (the idling stop state). Then, the control unit 40 terminates the subsequent processing. Since the oil pump 51 is stopped as the engine 10 is stopped, no oil pressure is supplied to the hydraulic circuit 50. At this time, since the electromagnetic switching valve 57 is switched to the closed state (the OFF state), and the branch oil passage 77 is cut off, the oil pressure in the accumulator 58 is retained.

[When it is determined in steps S12, S17 that the Acc pressure is not the predetermined value or more (S12: NO, S17: NO)]

In step S21, the control unit 40 switches the electromagnetic switching valve 57 to the open state (the ON state). That is, the control unit 40 opens the electromagnetic switching valve 57 by supplying electric power to the electromagnetic switching valve 57 for energization. Thus, the branch oil passage 77 is rendered in the communicating state, whereby the oil pressure of the oil pump 51 is accumulated in the accumulator 58. Then, the control unit 40 proceeds to step S22.

In step S22, the control unit 40 increases the line pressure of the hydraulic circuit 50. More specifically, the control unit 40 increases the line pressure by changing the amount of current that is supplied to the solenoids for controlling operation of the clutch pressure control valve 54 and the like. Then, the control unit 40 proceeds to step S23.

In step S23, the control unit 40 stops the processing until a predetermined time passes. Note that, as described above, the time required for the oil pressure in the accumulator 58 to reach a required value or more may be used as the predetermined time. In this example, by increasing the line pressure of the hydraulic circuit 50 to accumulate the oil pressure in the accumulator 58, the required oil pressure can be reliably accumulated in the accumulator 58 more quickly before the engine 10 is stopped. The control unit 40 proceeds to step S24 after the predetermined time has passed.

In step S24, the control unit 40 determines whether the Acc pressure is a predetermined value or more. That is, the control unit 40 makes this determination based on the oil pressure detected by the oil pressure sensor 59, as described above. If it is determined that the Acc pressure is the predetermined value or more (S24: YES), the control unit 40 proceeds to step S25. On the other hand, if it is determined that the Acc pressure is not the predetermined value or more (S24: NO), the control unit 40 proceeds to step S31.

In step S25, the control unit 40 switches the electromagnetic switching valve 57 to the closed state (the OFF state). That is, the control unit 40 closes the electromagnetic switching valve 57 by stopping energization of the electromagnetic switching valve 57. Then, the control unit 40 terminates the subsequent processing.

[When it is determined in step 24 that the Acc pressure is not the predetermined value or more (S24: NO)]

In step S31, the control unit 40 increases the engine speed. In the present embodiment, the oil pump 51 is a mechanical pump that operates according to operation of the engine 10. Thus, the rotational speed of the oil pump 51 increases as the engine speed is increased. Thus, the overall oil flow rate in the hydraulic circuit 50 can be increased. Note that the control unit 40 may gradually increase the engine speed, or may increase the engine speed to a predetermined engine speed, and maintain the predetermined engine speed. Thus, by accumulating the oil pressure in the accumulator 58 by increasing the rotating speed of the oil pump 51, the required oil pressure can be reliably accumulated more quickly in the accumulator 58 before the engine 10 is stopped. Then, the control unit 40 proceeds to step S24. That is, the control unit 40 does not proceed to step S25 until the required oil pressure is accumulated in the accumulator 58.

When the engine 10 is then temporarily stopped as described above, the control unit 40 executes a processing routine of restarting the engine 10 from the idling stop state.

Figure 7:
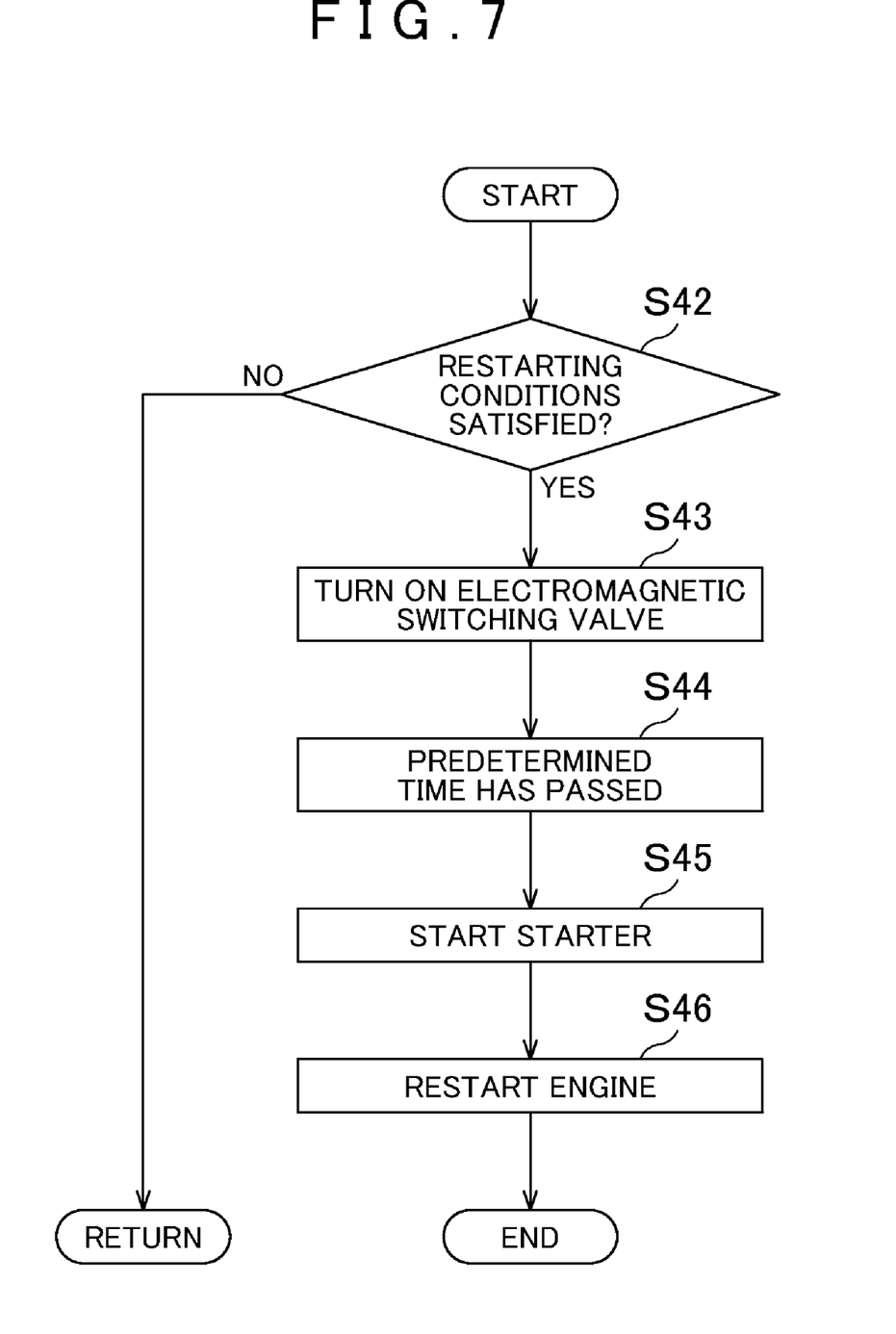
FIG. 7 is a flowchart illustrating the processing of restarting the engine by the control unit.
Figure 8A:
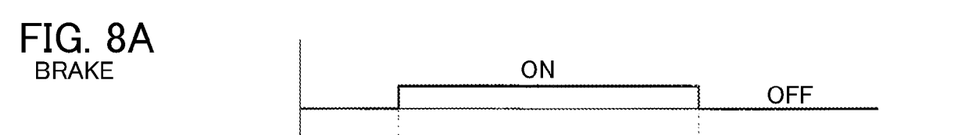
FIG. 8 is a time chart showing an example of the behavior of a C-1 pressure and an Acc pressure.
Figure 8B:
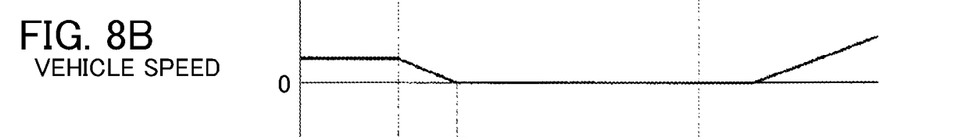
Figure 8C:
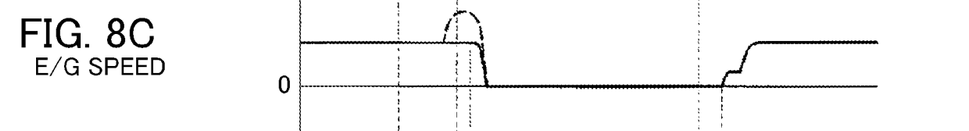
Figure 8D:
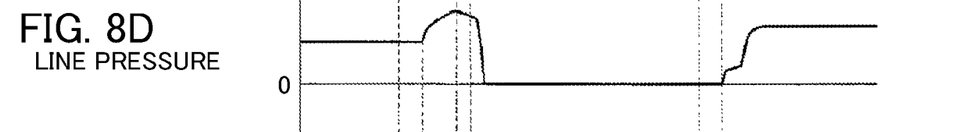
Figure 8E:
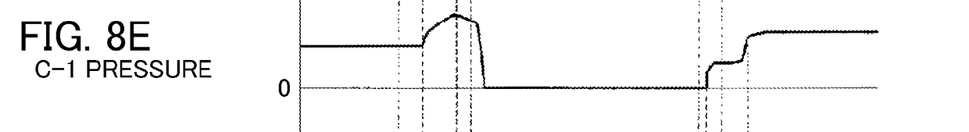
Figures 8F, 8G:
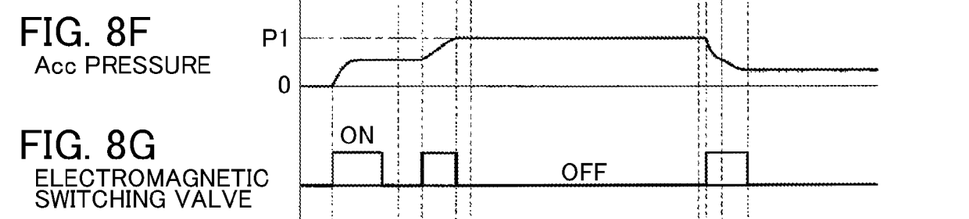
Figure 8H:
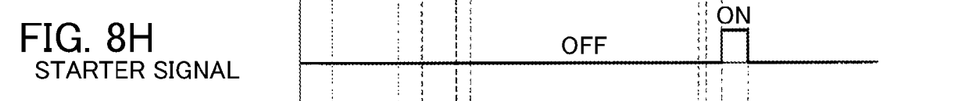

This processing of restarting the engine 10 from the idling stop state (a temporarily stopped state) will be described below with reference to FIG. 7. FIG. 7 is a flowchart illustrating the processing of restarting the engine by the control unit.

In step S42, the control unit 40 determines whether conditions for restarting the engine 10 have been satisfied or not. For example, the conditions for restarting the engine include a condition in which the vehicle speed is zero, a condition in which the brake switch is OFF, a condition in which the accelerator opening is not zero, and the like. If it is determined that the conditions for restarting the engine 10 have been satisfied (S42: YES), the control unit 40 proceeds to step S43. On the other hand, if it is determined that the conditions for restarting the engine 10 have not been satisfied (S42: NO), the control unit 40 terminates the processing routine.

In step S43, the control unit 40 switches the electromagnetic switching valve 57 to the open state (the ON state). That is, the control unit 40 opens the electromagnetic switching valve 57 by energizing the electromagnetic switching valve 57 as described above. Thus, the branch oil passage 77 is rendered in the communicating state, whereby the oil pressure accumulated in the accumulator 58 is supplied to the forward traveling clutch C1. Then, the control unit 40 proceeds to step S44.

In step S44, the control unit 40 stops the processing until a predetermined time passes. The predetermined time is not specifically limited herein, but may be, e.g., about 50 ms in view of the time required to complete opening of the electromagnetic switching valve 57. Then, the control unit 40 proceeds to step S45.

In step S45, the control unit 40 starts the starter 12. More specifically, the control unit 40 outputs a starter drive signal, which forms an engine restart signal, to the starter relay 22. Then, the control unit 40 proceeds to step S46.

In step S46, the control unit 40 outputs other signals that form the engine restart signal, such as the fuel injection signal and the ignition signal, to the fuel relay 21, the ignition relay 23, and the like, respectively.

In this manner, the starter 12 is driven, and a high voltage is supplied from the igniter 13 to the ignition plug, and fuel is injected from the injector 11. The engine 10 is restarted in this manner.

In the present embodiment, as described above, restarting of the engine 10 is started after the electromagnetic switching valve 57 is opened and the predetermined time has passed. Thus, opening of the electromagnetic switching valve 57 can be completed before large current is supplied to the starter 12 and the like. This enables current required to open the electromagnetic switching valve 57 to be reliably secured, whereby the electromagnetic switching valve 57 can be reliably opened when restarting the engine 10. As a result, the oil pressure of the accumulator 58 can be reliably supplied to the forward traveling clutch C1 when restarting the engine 10.

Next, an example of the behavior, which is exhibited by a C-1 pressure (an oil pressure that is applied to the forward traveling clutch C1) and the Acc pressure by the above control operation of the control unit 40, will be described with reference to FIG. 8. FIG. 8 shows a time chart showing an example of the behavior of the C-1 pressure and the Acc pressure.

[Behavior During Steady Traveling of the Vehicle]

In FIG. 8, at time t1, the vehicle speed is constant at a predetermined value, as shown in (b) (S1: YES, S2: YES). At this time, the control unit 40 opens the electromagnetic switching valve 57 as shown in (g) (step S3). As a result, the branch oil passage 77 is rendered in the communicating state, whereby the Acc pressure progressively increases as shown in (f). As shown in (g), the control unit 40 closes the electromagnetic switching valve 57 after the predetermined time (step S4, step S5). As a result, as shown in (f), a predetermined oil pressure is retained in the accumulator 58. Note that, in the example of FIG. 8, the Acc pressure has not reached a required pressure P1 at this point.

[Behavior when Stopping the Engine]

Then, at time t2, the driver of the vehicle steps on the brake switch, as shown in (a). As a result, the vehicle speed progressively reduces as shown in (b). When the vehicle speed reduces to a predetermined value (e.g., 5 to 10 km/h) at time t3, the control unit 40 determines whether the Acc pressure has reached the required pressure P1 (step S12). This example corresponds to the case where the Acc pressure has not reached the required pressure P1 (S12: NO). Thus, the control unit 40 opens the electromagnetic switching valve 57 as shown in (g) (step S21). At this time, the control unit 40 increases the line pressure as well, as shown in (d) (step S22). As shown in (e) and (f), the C-1 pressure and the Acc pressure also increase with the increase in the line pressure. In this example, since the Acc pressure reaches the required pressure P1 at time t4 as shown in (f) (S24: YES), the control unit 40 closes the electromagnetic switching valve 57 as shown in (g) (step S25). Note that, in the case where the Acc pressure does not reach the required pressure P1, or in the case where it is desired that the oil pressure be accumulated in a short period of time, the engine speed may be increased as shown by broken line in (c). This can increase the rotational speed of the oil pump 51, whereby the overall oil flow rate in the hydraulic circuit 50 can be increased. This enables the Acc pressure to reliably reach the required pressure P1 in a shorter period of time. The control unit 40 stops the vehicle at time t4, as shown in (b), and stops the engine 10 at time t5, as shown in (c) (step S19).

[Behavior when Restarting the Engine]

Then, the brake is turned OFF at time t6, as shown in (a), and the restarting conditions are satisfied at time t7 (step S41, step S42). Thus, the control unit 40 opens the electromagnetic switching valve 57, as shown in (g) (step S43). With the opening of the electromagnetic switching valve 57, the oil pressure of the accumulator 58 is supplied to the forward traveling clutch C1, whereby the C-1 pressure increases as shown in (e), and the Acc pressure decreases as shown in (f).

At time t8, which is, e.g., 50 ms after time t7, the control unit 40 outputs a starter signal as shown in (h), and the engine speed (the E/G speed) starts to increase as shown in (c) (steps S44 through S46). At time t9, the control unit 40 closes the electromagnetic switching valve 57 as shown in (g), and stops outputting the starter signal as shown in (h).

Note that, since the accumulator 58 generally requires about several seconds to accumulate the oil pressure, the time during which the electromagnetic switching valve 57 is closed (OFF) to retain the oil pressure is actually longer than the time during which the electromagnetic switching valve 57 is opened (ON) to accumulate the oil pressure, as shown in (g) of FIG. 8. Therefore, the present embodiment uses a normally closed type valve as the electromagnetic switching valve 57. This enables the accumulated oil pressure in the accumulator 58 to be retained without supplying electric power to the electromagnetic switching valve 57. As a result, the electromagnetic switching valve 57 can be efficiently controlled, and the electric power required to drive the electromagnetic switching valve 57 can be reduced.

As described in detail above, in the vehicle drive system of the present embodiment, the oil pressure generated while the oil pump 51 is driven is accumulated in the accumulator 58. On the other hand, the oil pressure in the accumulator 58 is retained by the electromagnetic switching valve 57 while the oil pump 51 is stopped. If the control unit 40 determines to restart the engine 10 after temporary stop of the engine 10, the control unit 40 opens the electrostatic switching valve 57 before starting restarting of the engine 10, thereby supplying the oil pressure accumulated in the accumulator 58 to the forward traveling clutch C1. Thus, by opening the electromagnetic switching valve 57 before starting restarting of the engine 10, the electromagnetic switching valve can be opened before large current is supplied to the starter and the like. Thus, current required to open the electromagnetic switching valve 57 can be reliably secured, whereby the electromagnetic switching valve 57 can be reliably opened when restarting the engine 10. As a result, when restarting the engine 10, the oil pressure in the accumulator 58 can be reliably supplied to the forward traveling clutch C1, and engagement shocks of the forward traveling clutch C1 can be appropriately prevented.

Moreover, in this vehicle drive system, since the control unit 40 starts restarting of the engine 10 after opening of the electromagnetic switching valve 57 is completed (after a predetermined time), current is supplied to the starter and the like with the electromagnetic switching valve 57 being reliably opened. That is, when restarting the engine 10, the electromagnetic switching valve 57 can be reliably opened, and the oil pressure of the accumulator 58 can be reliably supplied to the forward traveling clutch C1.

Second Embodiment

Figure 9:
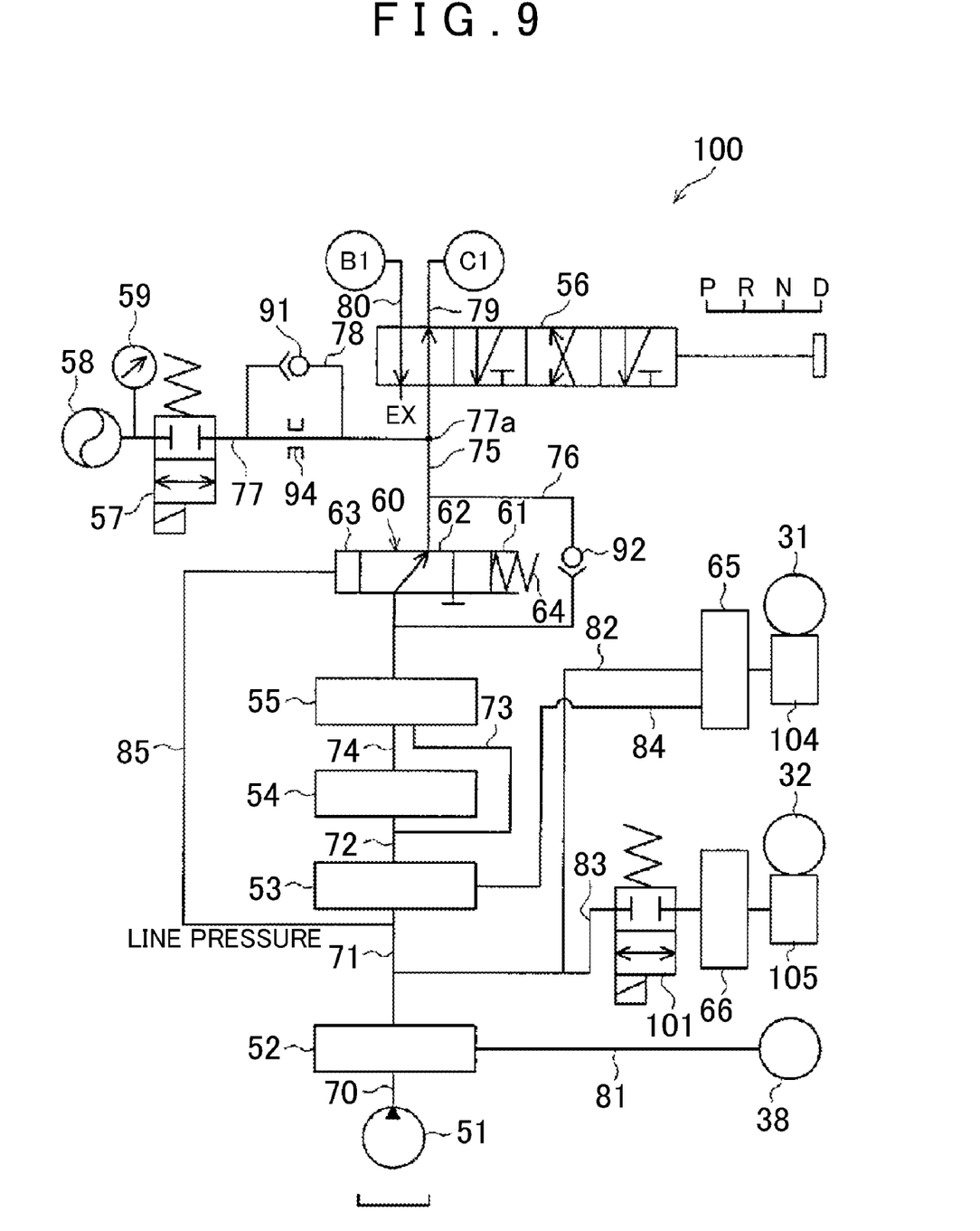
FIG. 9 is a diagram showing a hydraulic circuit according to a second embodiment.

Next, a second embodiment, which embodies the vehicle drive apparatus of the present invention, will be described in detail with reference to FIG. 9. FIG. 9 is a diagram showing a hydraulic circuit of the second embodiment. Note that the same components as those of the first embodiment are denoted by the same reference numerals, and description thereof will be omitted as appropriate. The differences between the first and second embodiments will be mainly described below.

The vehicle drive apparatus of the second embodiment is different from the first embodiment in the structure of the hydraulic circuit and the structure of the hydraulic cylinder. In a hydraulic circuit 100 of the present embodiment, as shown in FIG. 9, an electromagnetic switching valve 101 for retaining an oil pressure of a hydraulic cylinder 105 is provided instead of the one-way valve 93 (see FIG. 4). Note that the electromagnetic switching valve 101 of the present embodiment corresponds to a "second electromagnetic switching valve" of the present invention.

The electromagnetic switching valve 101 is a normally open type valve that is closed when being energized, and opened when being de-energized. This electromagnetic switching valve 101 is provided in the oil passage 83 connecting the hydraulic cylinder 105 and the oil pump 51. More specifically, the electromagnetic switching valve 101 is provided upstream of the secondary sheave pressure control valve 66 provided in the oil passage 83. The oil pressure supplied from the oil pump 51 is regulated by the line regulator 52, and then, passes through the electromagnetic switching valve 101 and the secondary sheave pressure control valve 66 via the oil passage 83, and is supplied to the hydraulic cylinder 105. Moreover, the oil passage 82, which is branched from the oil passage 83 on the upstream side of the electromagnetic switching valve 101, is connected to a hydraulic cylinder 104 through the shift control valve 65. Thus, the oil pressure supplied from the oil pump 51 is regulated by the line regulator 52, and then, passes through the shift control valve 65 via the oil passage 82 that is branched from the oil passage 83, so that the regulated oil pressure is supplied also to the hydraulic cylinder 104.

Each of the hydraulic cylinder 104 and the hydraulic cylinder 105 includes a seal member for retaining the oil pressure in the corresponding cylinder when no oil pressure is supplied from the oil pump 51. Moreover, a seal member, having a superior seal property to that of the seal member of the hydraulic cylinder 105, is used as the seal member of the hydraulic cylinder 104. More specifically, for example, the seal member of the hydraulic cylinder 104 may have a double sealing structure.

Thus, since the seal member of the hydraulic cylinder 104 has a superior seal property to that of the seal member of the hydraulic cylinder 105, the seal property required for the hydraulic cylinder 104 can be ensured by using a simple structure, without providing any electromagnetic switching valve in the hydraulic cylinder 104. Note that the hydraulic cylinder 104 of the present embodiment corresponds to a "first hydraulic cylinder" of the present invention, and the hydraulic cylinder 105 of the present embodiment corresponds to a "second hydraulic cylinder" of the present invention.

Next, control operation, which is performed by the control unit 40 of the present embodiment, will be described. Note that, since control of the electromagnetic switching valve 57 by the control unit 40 according to the present embodiment is similar to that in the first embodiment, control of the electromagnetic switching valve 101 will be mainly described below.

The control unit 40 energizes the electromagnetic switching valve 101 only when the engine 10 is in the idling stop state, and the electromagnetic switching valve 57 is closed to retain the oil pressure accumulated in the accumulator 58. Since the electromagnetic switching valve 101 is a normally open type valve, the electromagnetic switching valve 101 is closed only in this state, and is otherwise in the open state. Controlling the electromagnetic switching valve 101 in this manner can reduce the energization time of the electromagnetic switching valve 101, whereby power consumption can be reduced.

Due to the above limitation on the energization time of the electromagnetic switching valve 101, the control unit 40 opens the electromagnetic switching valve 101 when opening the electromagnetic switching valve 57 to supply the oil pressure accumulated in the accumulator 58 to the forward traveling clutch C1. This enables the oil pressure of the oil pump 51, resulting from restarting of the engine 10, to be supplied to the hydraulic cylinder 105, while quickly supplying the oil pressure of the accumulator 58 to the forward traveling clutch C1.

Moreover, due to the above limitation on the energization time of the electromagnetic switching valve 101, the control unit 40 opens the electromagnetic switching valve 101, even if the engine 10 is in a stopped state other than the idling stop state, more specifically, even if an engine key is not located at an ignition ON position, and the driver does not intend to drive the engine 10 for traveling. Since the oil pump 51 is stopped while the engine 10 is stopped, oil is discharged from the hydraulic cylinder 105. The hydraulic cylinder 104 has a superior seal property to that of the hydraulic cylinder 105. Thus, a larger amount of oil remains in the hydraulic cylinder 104 than in the hydraulic cylinder 105. Accordingly, for example, if the vehicle is towed while the engine 10 is stopped, an oil pressure by the centrifugal force can be generated in the oil remaining in the hydraulic cylinder 104, by using rotation of the input shaft 115 during towing. By using this oil pressure, the movable sheave 112 of the primary pulley 31 can be made to slide so as to reduce the groove width D1 of the V-groove 113. Thus, the winding radius on the primary pulley 31 can be made larger than that on the secondary pulley 32. In this manner, a high gear is established when towing the vehicle.

As described in detail above, according to the vehicle drive apparatus of the second embodiment, oil leakage from the hydraulic cylinder 105 can be prevented by closing the electromagnetic switching valve 101 while the engine 10 is in the idling stop state. This can prevent air from entering the cylinder. Moreover, this can also prevent air from entering the hydraulic cylinder 105 when the oil pressure is supplied from the oil pump 51 to the hydraulic cylinder 105 at the restart of the engine 10. Thus, the oil pressure performance at the restart of the engine can be improved.

Moreover, when towing the vehicle, a high gear is established by using the oil remaining in the hydraulic cylinder 104. This can prevent seizures of the pulleys, and the like when towing the vehicle.

It should be understood that the above embodiments has been shown by way of example only, and are not intended to limit the present invention; various improvements and modifications can be made without departing from the scope of the invention.

For example, although the mechanical oil pump 51 connected to the engine 10 is shown in the above embodiments, the present invention may be applied to a vehicle drive system including an electric oil pump that is not connected to the engine 10.

Moreover, the above embodiments have been described with respect to the case where the oil pressure is accumulated in the accumulator 58 in advance even when the vehicle is traveling steadily. However, the oil pressure may be accumulated in the accumulator 58 only when stopping of the engine 10 is predicted based on a decrease in the vehicle speed.

Moreover, the above embodiments have been described with respect to the case where a normally closed type valve is used as the electromagnetic switching valve 57. However, a normally open vale valve may be used as the electromagnetic switching valve 57.

What is claimed is:

1. A vehicle drive apparatus, comprising:
an oil pump that generates an oil pressure;
a hydraulic servo that is connected to the oil pump through an oil passage, and is controllable by an oil pressure;
an accumulator that accumulates the oil pressure generated by the oil pump through a branch oil passage that is branched from the oil passage;
an electromagnetic switching valve that is disposed in the branch oil passage, and retains the oil pressure of the accumulator while the oil pump is stopped;
a switching valve control unit that controls opening and closing of the electromagnetic switching valve; and
a restart determining unit that determines whether to restart a vehicle drive source from a stopped state or not, wherein
when it is determined by the restart determining unit to restart the vehicle drive source, the switching valve control unit opens the electromagnetic switching valve before restarting of the vehicle drive source is started so as to supply the oil pressure accumulated in the accumulator to the hydraulic servo.

2. The vehicle drive apparatus according to claim 1, wherein
the electromagnetic switching valve is a normally closed type valve that is opened when being energized, and is closed when being de-energized.

3. The vehicle drive apparatus according to claim 1, wherein
the switching valve control unit opens the electromagnetic switching valve only for a predetermined time during steady operation of the vehicle drive source in order to accumulate the oil pressure in the accumulator.

4. The vehicle drive apparatus according to claim 1, wherein
restarting of the vehicle drive source is started after opening of the electromagnetic switching valve by the switching valve control unit is completed.

5. The vehicle drive apparatus according to claim 1, further comprising:
a belt-type continuously variable transmission including
an input shaft to which power of the vehicle drive source is input,
an output shaft that shifts the power input to the input shaft and outputs the shifted power,
a first pulley formed by a pair of sheaves provided on the input shaft,
a second pulley formed by a pair of sheaves provided on the output shaft,
a belt wound in a groove between the sheaves of the first pulley and a groove between the sheaves of the second pulley to run between the first pulley and the second pulley,
a first hydraulic cylinder capable of changing a groove width between the sheaves of the first pulley, and
a second hydraulic cylinder capable of changing a groove width between the sheaves of the second pulley, wherein the belt-type continuously variable transmission changes the groove width between the sheaves of the first pulley, and the groove width between the sheaves of the second pulley by using the first hydraulic cylinder and the second hydraulic cylinder so as to continuously shift the power input from the vehicle drive source to the input shaft to output the shifted power from the output shaft, wherein
the hydraulic servo transmits the power from the vehicle drive source to the input shaft when the oil pressure is supplied to the hydraulic servo,
the second hydraulic cylinder is connected to the oil pump through an oil passage, and
a second electromagnetic switching valve that selectively retains an oil pressure of the second hydraulic cylinder is provided in the oil passage that connects the second hydraulic cylinder and the oil pump to each other.

6. The vehicle drive apparatus according to claim 5, further comprising:
a second switching valve control unit that controls opening and closing of the second electromagnetic switching valve, wherein
when the vehicle drive source is in an idling stop state, and the switching valve control unit retains the oil pressure accumulated in the accumulator by closing the electromagnetic switching valve, the second switching valve control unit closes the second electromagnetic switching valve to retain the oil pressure of the second hydraulic cylinder, and
when the vehicle drive source is in a stopped state other than the idling stop state, the second switching valve control unit opens the second electromagnetic switching valve to release the oil pressure of the second hydraulic cylinder.

7. The vehicle drive apparatus according to claim 6, wherein
each of the first hydraulic cylinder and the second hydraulic cylinder includes a seal member that retains the oil pressure in the corresponding cylinder when no oil pressure is supplied from the oil pump, and
the seal member of the first hydraulic cylinder has a superior seal property to the sealing property of the seal member of the second hydraulic cylinder.

* * * * *